(12) United States Patent
Okuhira et al.

(10) Patent No.: US 6,559,269 B2
(45) Date of Patent: May 6, 2003

(54) CURABLE RESIN COMPOSITION AND NOVEL LATENT CURING AGENT

(75) Inventors: Hiroyuki Okuhira, Kanagawa (JP); Kazuo Suga, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/091,543

(22) Filed: Mar. 7, 2002

(65) Prior Publication Data

US 2002/0183461 A1 Dec. 5, 2002

(30) Foreign Application Priority Data

Mar. 9, 2001 (JP) ........................................ 2001-067589
Mar. 15, 2001 (JP) ........................................ 2001-074138

(51) Int. Cl.$^7$ .............................................. C08G 59/68
(52) U.S. Cl. .................. 528/94; 525/403; 525/523; 525/535; 528/73; 528/377; 528/378; 528/380; 548/110; 548/215
(58) Field of Search ................. 528/377, 378, 528/380, 73, 94; 525/523, 535, 403; 548/110, 215

(56) References Cited

FOREIGN PATENT DOCUMENTS

JP          1036481      *   2/1998

\* cited by examiner

Primary Examiner—Robert Dawson
Assistant Examiner—D. Aylward
(74) Attorney, Agent, or Firm—Rader, Fishman & Grauer PLLC

(57) ABSTRACT

A curable resin composition which has excellent curability and storage stability, and in particular, which has improved storage stability under the condition where the resin composition only contains the resin component and the latent curing agent. A curable resin composition having a resin component having oxirane ring and thiirane ring at a ratio (oxirane ring/thiirane ring) of 95/5 to 1/100; and an oxazolidine compound represented by the following formula (1):

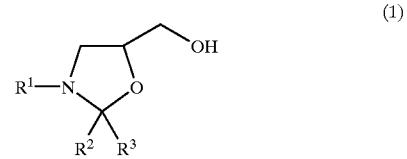

(1)

wherein $R^1$ represents a hydrocarbon group having 1 to 6 carbon atoms, and $R^2$ and $R^3$ independently represent hydrogen atom or a monovalent hydrocarbon group having 1 to 15 carbon atoms, or together form an alicyclic ring or an aromatic ring.

20 Claims, No Drawings

CURABLE RESIN COMPOSITION AND NOVEL LATENT CURING AGENT

BACKGROUND OF THE INVENTION

This invention relates to a curable resin composition, and more specifically, to a curable resin composition which exhibits excellent curability and storage stability.

This invention also relates to a novel compound which is well adapted for use as a latent curing agent for epoxy resin and/or thiirane resin, and also, to a curable resin composition containing such compound.

It has been known to use ketimine as a latent curing agent in one part curable resin composition containing an epoxy resin. The curable resin composition produced by using ketimine, however, suffered from the problem of low storage stability. In view of such situation, attempts have been made to improve the storage stability by converting the ketimine used as the latent curing agent with the type which is sterically hindered to a considerable degree to thereby provide a one part curable epoxy resin composition which exhibits improved storage stability without detracting from curability (JP 11-21532 A, JP 2000-178343 A, etc.).

Such use of the sterically hindered ketimine, however, did not fully improve the storage stability of the one part curable epoxy resin composition, and in particular, the resin composition still suffered from the problem of poor storage stability under the condition where the resin composition only contained the resin component and the latent curing agent as its only components, namely, in the absence of a filler, a plasticizer, a thixotropic agent, or other additives. When the storage stability under the condition that the resin composition only contains the resin component and the latent curing agent is low, reaction (i.e. increase in the molecular weight of the resin composition) proceeds during the storage, and this results in the increased viscosity and poor working convenience after blending with other agents and being made into a commodity, as well as reduced performance including the poor adhesion to the object on which the resin composition is applied because of poor contact.

In the case of thiirane resin which is more reactive than the epoxy resin, the problem of the poor storage stability under the condition where the resin composition only contains the resin component and the latent curing agent is more serious.

SUMMARY OF THE INVENTION

In view of the situation as described above, first object of the present invention is to provide a curable resin composition which has excellent curability and storage stability, and in particular, which has improved storage stability under the condition where the resin composition only contains the resin component and the latent curing agent.

Second object of the present invention is to provide a novel composition which can be used as a latent curing agent for an epoxy resin and/or a thiirane resin; and a curable resin composition which comprises the epoxy resin and/or the thiirane resin as its main polymer and the novel compound as the latent curing agent, and which has improved storage stability under the condition where the resin composition only contains the resin component and the latent curing agent.

In order to achieve the first object, there is provided as the first aspect of the present invention a curable resin composition (hereinafter also referred to as the "first composition of the present invention") comprising a resin component having oxirane ring and thiirane ring at a ratio (oxirane ring/thiirane ring) of 95/5 to 1/100; and a resin component having oxirane ring and thiirane ring at a ratio (oxirane ring/thiirane ring) of 95/5 to 1/100; and an oxazolidine compound represented by the following formula (1):

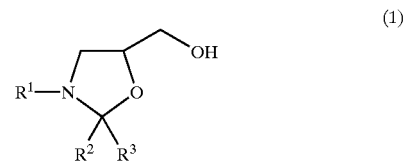

wherein $R^1$ represents a hydrocarbon group having 1 to 6 carbon atoms, and $R^2$ and $R^3$ independently represent hydrogen atom or a monovalent hydrocarbon group having 1 to 15 carbon atoms, or together form an alicyclic ring or an aromatic ring.

In the oxazolidine compound represented by the formula (1), $R^1$ is preferably methyl group or ethyl group, and $R^2$ is preferably a hydrocarbon group wherein the carbon at the first position is a branched carbon or a ring member carbon.

The oxazolidine compound represented by the formula (1) undergoes ring opening reaction through hydrolysis in the curable resin composition in the presence of moisture (water content), and it functions as a latent curing agent by reacting with the oxirane ring or the thiirane ring. This oxazolidine compound exhibits excellent curability, and also, improved storage stability since it has a substituent, and to be more specific, a bulky substituent around the nitrogen atom in the heterocycle and this results in the reduced reactivity with the moisture compared to conventional ketimine.

In addition, the resin component in the first composition of the present invention has thiirane ring. In contrast to the oxirane ring which easily reacts with both acidic and basic groups, thiirane ring has a nature that it is reactive with a basic group while it is relatively less reactive with an acidic group. The oxazolidine compound represented by the formula (1) exhibits only a weak basicity since a bulky group is present around the nitrogen atom in the amino group, and it also has a hydroxy group (—OH) which is an acidic group, and as a consequence, this oxazolidine compound is relatively reactive with the oxirane ring while it is relatively less reactive with the thiirane ring. Accordingly, the thiirane compound wherein a part or all of the oxirane ring has been substituted with the thiirane ring is less reactive with the oxazolidine compound represented by the formula (1) during the storage compared to the epoxy compounds including only the oxirane ring, and the first composition of the present invention exhibits improved storage stability compared to the composition comprising the epoxy compound including only the oxirane ring.

The first composition of the present invention which contains a thiirane compound having the thiirane ring as the resin component, and an oxazolidine compound as the latent curing agent exhibits both excellent curability and improved storage stability, and such composition is quite useful. To be more specific, this composition can be used with no practical problem even if it was not diluted with a filler or a plasticizer since it has significantly improved storage stability under the condition where it only comprises the resin component and the latent curing agent.

This invention also provides the first composition of the present invention which further comprises an isocyanate compound having at least two isocyanate groups in one molecule. This composition also exhibits both excellent curability and improved storage stability, and in particular, an improved storage stability under the condition where it only comprises the resin component and the latent curing agent.

In order to achieve the first object, there is also provided as the second aspect of the present invention a curable resin composition (hereinafter also referred to as the "second composition of the present invention") comprising a resin compound having isocyanate group and thiirane ring, and an oxazolidine compound represented by the formula (1). This second composition also exhibits excellent curability and improved storage stability, and in particular, a storage stability under the condition where the resin composition only contains the resin component and the latent curing agent.

In order to achieve the second object, there is provided as the third aspect of the present invention a compound (hereinafter also referred to as the "compound of the present invention") obtained from an oxazolidine compound represented by the formula (1) and a compound having at least one functional group selected from the group consisting of alkoxysilyl group, isocyanate group, vinylether group, and carboxy group through addition or condensation between hydroxy group of the oxazolidine compound and the functional group of the compound having at least one functional group.

In the compound of the present invention, the hydroxy group in the oxazolidine compound of the formula (1) is protected, and the storage stability of the curable resin composition produced by using such oxazolidine compound is superior to the composition produced by using the oxazolidine compound of the formula (1) whose hydroxy group is unprotected. In particular, such curable resin composition is useful since it has extremely high storage stability under the condition where the resin composition only contains the resin component and the latent curing agent, and this resin composition can used with no dilution by the filler or the plasticizer.

In addition, if the compound having at least one functional group selected from the group consisting of alkoxysilyl group, isocyanate group, vinylether group, and carboxy group is a multifunctional compound, the curable resin composition produced by using such compound will also have a good surface curability.

In order to achieve the second object, there is provided as the fourth aspect of the present invention a curable resin composition (hereinafter also referred to as the "third composition of the present invention") comprising at least one resin selected from epoxy resin and thiirane resin; and the compound of the present invention.

Since the third composition of the present invention contains the compound of the present invention as the curing agent, it exhibits excellent storage stability and favorable surface curability, and in particular, excellent storage stability under the condition where the resin composition only contains the resin component and the latent curing agent.

DETAILED DESCRIPTION OF THE INVENTION

First, the first aspect of the present invention is described.

The resin component of the first composition of the present invention is a resin component having oxirane ring and thiirane ring at a ratio (oxirane ring/thiirane ring) of 95/5 to 1/100, and preferably 95/5 to 10/90. The resin component may solely contain compound (A) wherein oxirane ring in the epoxy compound has been totally or partly replaced with thiirane ring; or contain both such compound (A) and epoxy compound (B) which only contain oxirane ring in its molecule.

The compound (A) may be either compound (A-1) wherein oxirane ring in the molecule is totally replaced with thiirane ring so that only thiirane ring is included in the molecule, or compound (A-2) wherein oxirane ring in the molecule is only partly replaced with thiirane ring so that both thiirane ring and oxirane ring are included in the molecule. In other words, the resin component of the first composition of the present invention may comprise any of the following combinations:

(i) only compound (A-2);
(ii) compound (A-1) and compound (B);
(iii) compound (A-2) and compound (B);
(iv) compound (A-1) and compound (A-2);
(v) compound (A-1), compound (A-2), and compound (B); and
(vi) only compound (A-1).

Among these, the most preferred is the first composition of the present invention containing the resin component (iii) in view of the strong adhesion realized.

Compound (A) may be synthesized from an epoxy compound. The epoxy compound which may be used to produce the compound (A) include an epoxy compound wherein all of the substituent Y in the following formulae (a), (b), (d), (e), and (f) are the oxirane ring represented by the following formula (2):

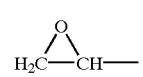
(2)

and an epoxy compound wherein all of Z in the following formula (c) are oxygen atom. It is to be noted that, in the following formulae (a) and (b), n is an integer of 0 or 1 or more, and in the following formula (f), $R^6$ is any divalent organic group.

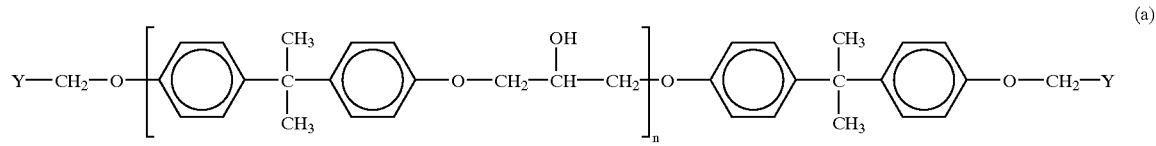
(a)

-continued

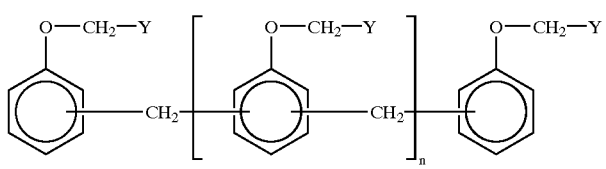
(b)

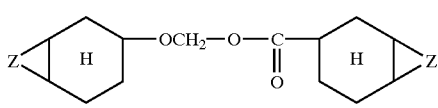
(c)

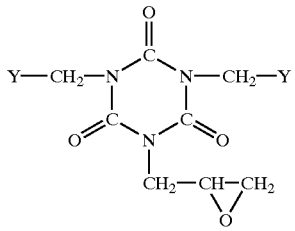
(d)

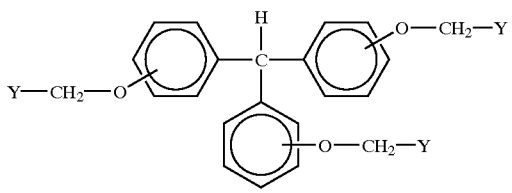
(e)

Y—CH₂—O—R⁶—O—CH₂—Y
(f)

Exemplary epoxy compounds also include a compound represented by the following formula (3):

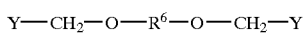 (3)

wherein all Y in the formula are the oxirane ring represented by the formula; and a compound having the group represented by the following formula (4):

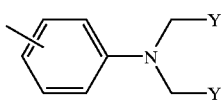 (4)

wherein all Y in the formula are the oxirane ring represented by the formula (2). It should be noted that R in the formula (3) represents an alkyl group having 1 or more carbon atoms, and m represents an integer of 1 to 4. The compound having the group represented by the formula (4) in its molecule is not limited to any particular compound, and the group bonding to the group represented by the formula (4) may be hydrogen atom, an alkyl group such as methyl or ethyl group, phenyl group, or the like. The compound having the group represented by the formula (4) in its molecule may also be a compound having two or more groups represented by the formula (4), for example, wherein two such groups represented by the formula (4) are bonding to each other either directly or with an intervening group such as methylene group.

Such epoxy compound may also be an epoxy compounds wherein hydrogen atom or other group in the molecule is substituted with a halogen atom, for example, a compound represented by the following formula (g):

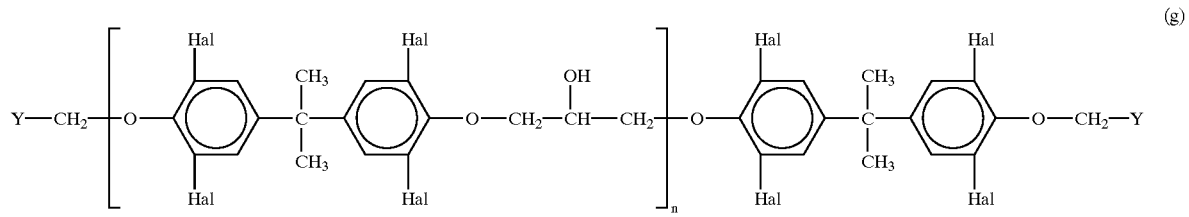
(g)

wherein Hal represents a halogen atom. Exemplary halogen atoms include bromine, chlorine, and fluorine.

Exemplary compound (A) which may be used in the present invention is a compound of the formulae (a), (b), (d), (e), (f), or (g) wherein at least one of the two or more Y is thiirane ring represented by the following formula (5):

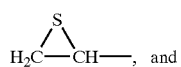
(5)

Y which is not the thiirane ring is the oxirane ring represented by the formula (2); and a compound of the formula (c) wherein at least one Z is sulfur and the Z which is not sulfur is oxygen.

Exemplary epoxy compounds also include a compound represented by the formula (3) wherein at least one of Y in the formula is the thiirane ring represented by the formula (5) and the Y which is not the thiirane ring is oxirane ring represented by the formula (2); and a compound having the group represented by the formula (4) wherein at least one of the Y in the formula is the thiirane ring represented by the formula (5) and the Y which is not the thiirane ring is oxirane ring represented by the formula (2). In such compounds, it is also possible that all of Y in the formula are the thiirane ring represented by the formula (5). It should be noted that R in the formula (3) represents an alkyl group having 1 or more carbon atoms, and m represents an integer of 1 to 4. The compound having the group represented by the formula (4) in its molecule is not limited to any particular compound, and the group bonding to the group represented by the formula (4) may be hydrogen atom, an alkyl group such as methyl or ethyl group, phenyl group, or the like. The compound having the group represented by the formula (4) in its molecule may also be a compound having two or more groups represented by the formula (4), for example, wherein two or more such groups represented by the formula (4) are bonding to each other either directly or with an intervening group such as methylene group.

Typical examples of the compound (A) are those represented by the following formulae:

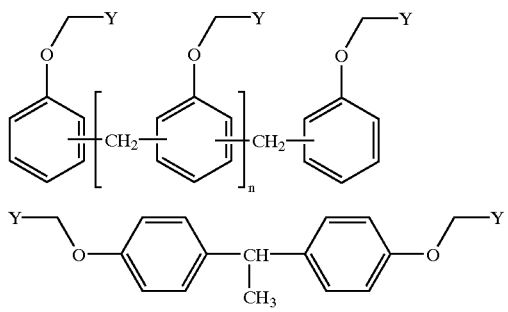

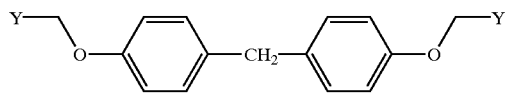

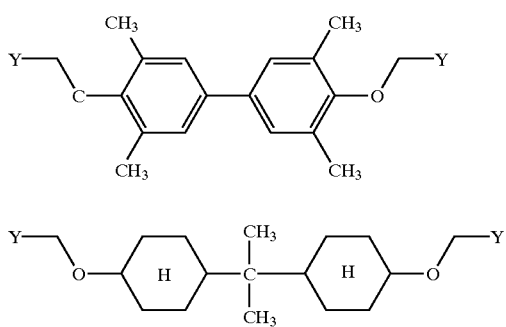

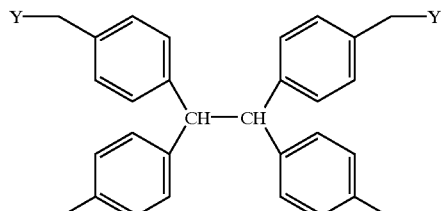

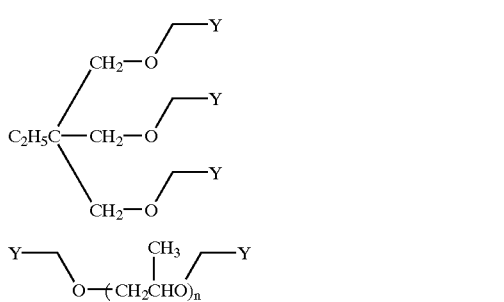

(6)

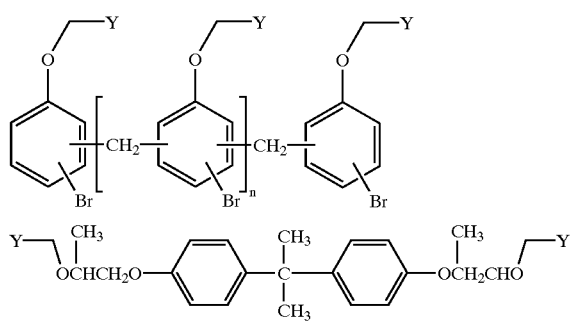

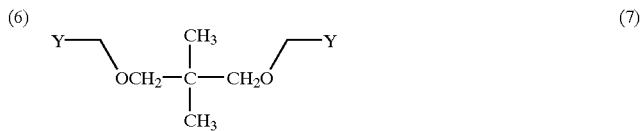

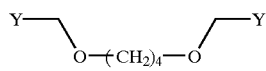

(7)

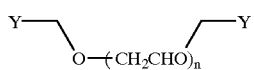
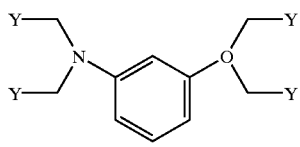
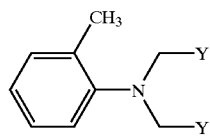
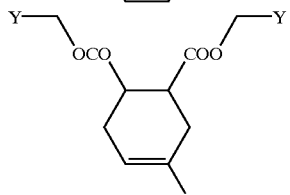

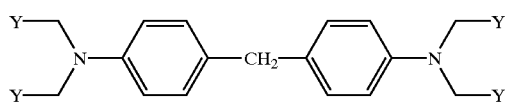
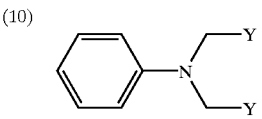
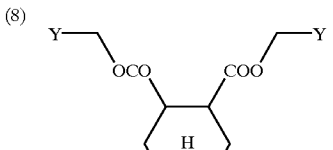
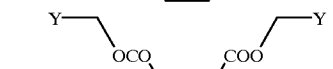
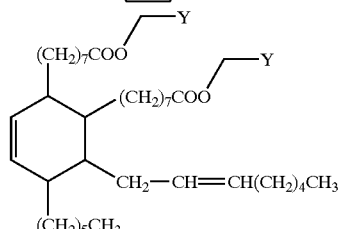
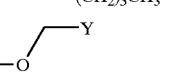

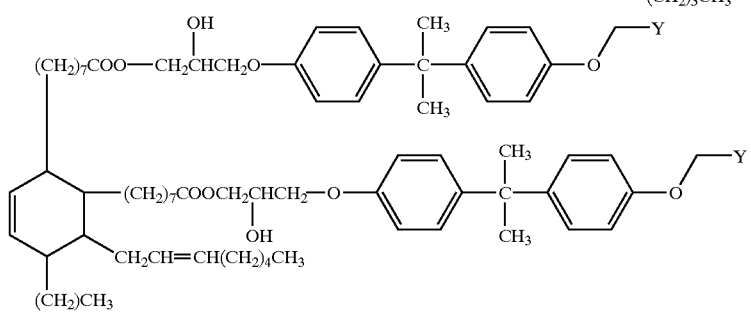

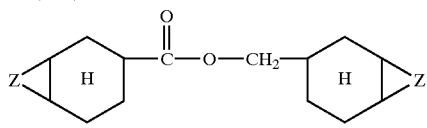
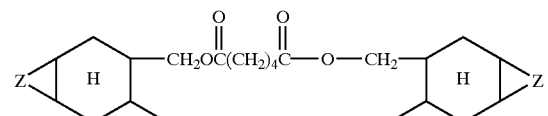

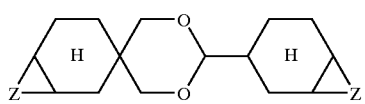
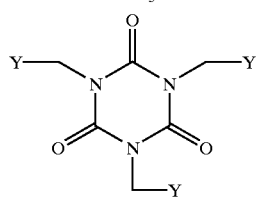

wherein at least one of the two or more Y in the formula is the thiirane ring represented by the formula (5) and the Y which is not the thiirane ring is the oxirane ring represented by the formula (2); at least one Z is sulfur and the Z which is not sulfur is oxygen; and n is an integer of 0, 1 or more. In such compounds, it is also possible that all of Y in the formula are the thiirane ring represented by the formula (5).

Of the formulae listed above, formulae (6) and (7) represent typical compounds (thiirane resins) represented by the formula (3); and formulae (8), (9), (10) and (11) represent typical compounds (thiirane resins) having the group represented by the formula (4) in their molecule, respectively. Among these, the preferred are thiirane resins represented by formula (6), (7) and (8).

Compound (A) may be produced by the method wherein the epoxy compound is reacted with an episulfidating agent in a polar solvent under vigorous agitation. Typical episulfidating agents which may be used include potassium thiocyanate (KSCN) and thiourea.

Exemplary polar solvent which may be used include methanol, ethanol, acetone, water, and mixture of such solvents. To be more specific, when KSCN is used for the episulfidating agent, use of a mixed solvent of water and ethanol (water/ethanol, 2/1) is preferable to produce the compound (A-2) wherein degree of thiirane ring replacement is 50%, namely, wherein ratio of the content of the oxirane ring/thiirane ring is 50/50. On the other hand, use of acetone for the solvent is preferable to produce the compound (A-1) wherein degree of thiirane ring replacement is 100%, namely, wherein ratio of the content of the oxirane ring/thiirane ring is 0/100.

The reaction may be promoted typically at a temperature in the range of 10 to 35° C., for example, at room temperature for approximately 10 to 40 hours, for example, for about 20 hours in an atmosphere which may be either air or an inert atmosphere such as nitrogen.

Compound (B) which may be included in the first composition of the present invention that includes oxirane ring but no thiirane ring within its molecule may be any of the epoxy compounds indicated as the epoxy compounds for use in producing the compound (A). Exemplary such compounds include those indicated as examples of compound (A) wherein all of substituent Y are oxirane ring represented by the formula (2) and n is an integer of 0, 1 or more, and wherein all of Z are oxygen. Among such compounds, use of a bifunctional epoxy compound having two oxirane rings in the molecule is favorable since the resulting first composition of the present invention will exhibit strong adhesion. Particularly preferred is a bisphenol F epoxy compound in view of low viscosity and high working convenience.

In the first composition of the present invention, the ratio of the content of oxirane ring/thiirane ring is in the range of 95/5 to 0/100, and preferably in the range of 95/5 to 10/90 in view of the storage stability and the curability, and more preferably, in the range of 90/10 to 60/40 in view of the excellent storage stability.

The resin component of the first composition of the present invention is preferably a liquid having a viscosity at 25° C. of up to 100,000 mPa·s. The first composition of the present invention containing such resin component cures at room temperature at a high speed. The resin component having a viscosity at 25° C. of up to 100,000 mPa·s is preferably a resin each having an equivalent of up to 450 g/eq in the state of epoxy compound before the replacement of oxirane with thiirane, or a mixture of resins combined so that the average equivalent is up to 450 g/eq. Among such resin components, the most preferred are bisphenol A epoxy resin and bisphenol F epoxy resin having an epoxy equivalent of 150 to 300. Use of hydrogenated bisphenol A epoxy resin and other alicyclic epoxy compounds is preferable in view of the storage stability.

The first composition of the present invention may further comprise an isocyanate compound having at least two isocyanate groups in one molecule as a resin component in addition to the resin component having the oxirane ring and the thiirane ring as described above. The oxazolidine compound represented by the formula (1) will then undergo ring opening through hydrolysis for reaction with this isocyanate group. The isocyanate group also reacts with the thiol group produced through the ring opening of the thiirane group by the oxazolidine compound represented by the formula (1) to form a cross-linked structure. The content of the isocyanate compound is not limited. However, it is preferable to use 10 to 800 parts by weight, and in particular, 30 to 700 parts by weight of the isocyanate compound having at least two isocyanate groups in one molecule per 100 parts by weight of the resin component having the oxirane ring and the thiirane ring in view of the high curing speed and superior physical properties after the curing.

Exemplary isocyanate compounds having at least two isocyanate groups in one molecule include aromatic polyisocyanates such as 2,4-tolylene diisocyanate, 2,6-tolylene diisocyanate, 4,4'-diphenylmethane diisocyanate, 2,4'-diphenylmethane diisocyanate, p-phenylene diisocyanate, and polymethylene polyphenylene polyisocyanate; aliphatic polyisocyanates such as hexamethylene diisocyanate (HDI), and tetramethylxylylene diisocyanate (TMXDI); alicyclic polyisocyanates such as isophorone diisocyanate (IPDI); arylaliphatic polyisocyanates such as xylylene diisocyanate; and the polyisocyanate as mentioned above modified with carbodiimide or isocyanurate; which may be used either alone or in combination of two or more.

The isocyanate compound having at least two isocyanate groups in one molecule used may also be a urethane prepolymer produced by reacting the isocyanate compound as mentioned above with a polyol compound. The polyol compound used may be any of polyether polyols, polyester polyols, other polyols, and mixtures thereof as in the case of typical polyurethane resin compositions.

A typical polyether polyol is the one produced by addition polymerization of one or more of alkylene oxides such as ethylene oxide, propylene oxide, butylene oxide, styrene oxide, and tetrahydrofurane with one or more compound having two or more active hydrogens.

Examples of the compound having two or more active hydrogens include polyhydric alcohols, amines, and alkanol amines.

Exemplary polyhydric alcohols include ethylene glycol, diethylene glycol, propylene glycol, dipropylene glycol, glycerine, 1,1,1-trimethylol propane, 1,2,5-hexanetriol, 1,3-butanediol, 1,4-butanediol, 4,4'-dihydroxyphenylpropane, 4,4'-dihydroxyphenylmethane, and pentaerythritol. Exemplary amines include ethylenediamine. Exemplary alkanolamines include ethanolamine and propanolamine.

Exemplary polyester polyols include those produced by polycondensation of one or more of low molecular weight polyols such as ethylene glycol, propylene glycol, butanediol, pentanediol, hexanediol, cyclohexanedimethanol, glycerine, and 1,1,1-trimethylol propane with one or more of low molecular weight carboxylic acids or oligomeric acids such as glutaric acid, adipic acid, pimelic acid, suberic acid, sebasic acid, terephthalic acid, isophthalic acid, and dimeric acid; and those produced by ring opening polymerization of propionelactone, valerolactone, or the like.

Exemplary other polyols include polycarbonate polyol; polybutadiene polyol; hydrogenated polybutadiene polyol; acrylpolyol; and ethylene glycol, diethylene glycol, propylene glycol, dipropylene glycol, butanediol, pentanediol, hexanediol and other low molecular weight polyols.

The urethane prepolymer having the isocyanate group at the terminal of the molecule may be produced by mixing such polyol compound with an excessive amount of polyisocyanate compound at a proportion of 1.2 to 5 equivalents (NCO equivalents), and preferably 1.5 to 3 equivalents of the polyisocyanate compound per 1 equivalent of the polyol compound (OH equivalent). The urethane prepolymer may be produced by mixing the compounds at the predetermined ratio and stirring the mixture while heating the mixture typically to a temperature in the range of 30 to 120° C., and preferably to the range of 50 to 100° C.

Next, the second aspect of the present invention is described.

The second composition of the present invention may be prepared by replacing the resin composition containing oxirane ring and thiirane ring of the first composition of the present invention with a compound containing isocyanate group and thiirane ring.

The compound containing isocyanate group and thiirane ring may be produced, for example, by converting the oxirane ring of a compound having hydroxy group and epoxy group or a compound obtained by adding a polyepoxy compound to a compound having hydroxy group and carboxylic acid (carboxy group) with thiirane ring by using thiourea or the like; and adding a polyisocyanate compound to the resulting compound. Typical such compounds include those represented by the following formulae. The compound containing isocyanate group and thiirane ring may further contain oxirane ring.

2-trimethylpropyl group, 1-ethyl-1-methylpropyl group, or 1-ethyl-2-methylpropyl group; or an alkenyl group corresponding to the alkyl group as mentioned above.

Among these, $R^1$ is preferably methyl group or ethyl group in view of the excellent surface curability of the resulting first and second composition of the present invention, and $R^1$ is most preferably methyl group.

$R^2$ and $R^3$ may independently represent hydrogen atom or a monovalent hydrocarbon group having 1 to 15 carbon atoms. Alternatively, $R^2$ and $R^3$ may together represent an alicyclic ring or aromatic ring.

Exemplary monovalent hydrocarbon groups having 1 to 15 carbon atoms include a straight-chain or a branched alkyl group having 1 to 15 carbon atoms (such as the alkyl group having 1 to 6 carbon atoms mentioned for $R^1$), an alkenyl group or an alkynyl group corresponding to such alkyl group; an aryl group which may be substituted with 1 or more substituent; an arylalkyl group; and a cycloalkyl group which may be substituted with 1 or more substituent. Examples include straight chain alkyl groups such as methyl group, ethyl group, propyl group, butyl group, pentyl group,

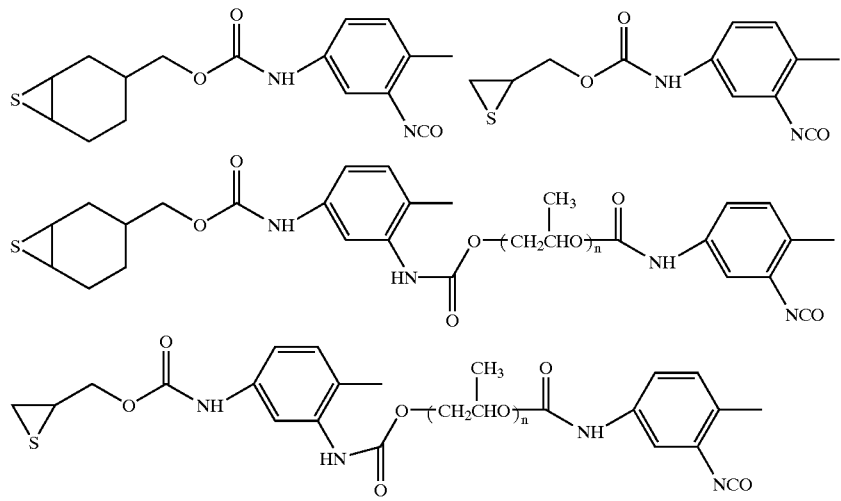

The oxazolidine compound used in the present invention is the compound represented by the following formula (1):

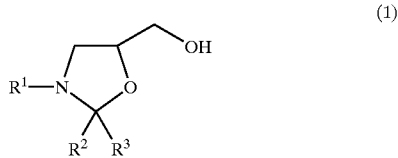

(1)

In formula (1), $R^1$ is a hydrocarbon group having 1 to 6 carbon atoms, which is typically an alkyl group having 1 to 6 carbon atoms such as methyl group, ethyl group, propyl group, isopropyl group, butyl group, isobutyl group, s-butyl group, t-butyl group, pentyl group, isopentyl group, neopentyl group, t-pentyl group, 1-methylbutyl group, 2-methylbutyl group, 1,2-dimethylpropyl group, hexyl group, isohexyl group, 1-methylpentyl group, 2-methylpentyl group, 3-methylpentyl group, 1,1-dimethylbutyl group, 1,2-dimethylbutyl group, 2,2-dimethylbutyl group, 1-3-dimethylbutyl group, 2,3-dimethylbutyl group, 3,3-dimethylbutyl group, 1-ethylbutyl group, 2-ethylbutyl group, 1,1,2-trimethylpropyl group, 1,2, octyl group, dodecyl group, and lauryl group; branched alkyl groups such as isopropyl group, isobutyl group, s-butyl group, t-butyl group, isopentyl group, neopentyl group, t-pentyl group, 1-methylbutyl group, and 1-methylheptyl group; alkenyl groups such as vinyl group, allyl group, isopropenyl group, and 2-methylallyl group; aryl groups such as tolyl group (o-, m-, p-), dimethylphenyl group, and mesityl group; arylalkyl groups such as benzyl group, phenethyl group, and α-methylbenzyl group; and cycloalkyl groups such as cyclopentyl group and cyclohexyl group.

The alicyclic or the aromatic ring which $R^2$ and $R^3$ may together represent may be an alicyclic or an aromatic ring having 4 to 10 carbon atoms. Exemplary alicyclic rings having 4 to 10 carbon atoms include cyclobutyl group, cyclopentyl group, cyclohexyl group, cycloheptyl group, and cyclooctyl group; and exemplary aromatic rings having 4 to 10 carbon atoms include phenyl group, benzyl group, tolyl group (o-, m-, p-), and xylyl group.

Among such functional groups, $R^2$ is preferably a bulky group such as a branched hydrocarbon group or a hydrocarbon group containing an alicyclic or an aromatic ring, for example, a branched alkyl group such as isobutyl group, an aryl group, an arylalkyl group, or a cycloalkyl group, since nitrogen atom in the heterocycle (oxazolidine ring) will then be protected through steric hindrance by such substituent to result in a considerably reduced basicity of the nitrogen atom, and hence, the resulting first or the second composition of the present invention will exhibit an improved storage stability.

Among such functional group, $R^2$ is most preferably a hydrocarbon group wherein carbon at the first position is a branched carbon or a ring-member carbon, since the resulting first or the second composition of the present invention will exhibit an improved storage stability.

Examples of the $R^2$ wherein carbon at the first position of the hydrocarbon group is a branched carbon include isopropyl group, s-butyl group, t-butyl group, t-pentyl group, 1-methylbutyl group, 1-methylheptyl group, and isopropenyl group.

Examples of the $R^2$ wherein carbon at the first position of the hydrocarbon group is a ring-member carbon include aryl groups such as phenyl group, tolyl group (o-, m-, p-), and dimethylphenyl group; arylalkyl groups such as α-methylbenzyl group; and cycloalkyl groups such as cyclopentyl group, cyclohexyl group, and methylcyclohexyl group. The ring-member carbon may be either a carbon constituting an aromatic ring or an alicyclic ring.

Among these, $R^2$ is most preferably isopropyl group, t-butyl group, or cyclohexyl group in view of the availability of raw materials and ease of synthesis.

Examples of the preferable oxazolidine compounds represented by the formula (1) are those represented by the following formulae (12), (13), and (14):

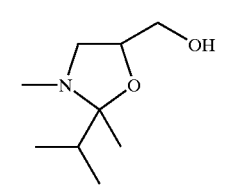

(12)

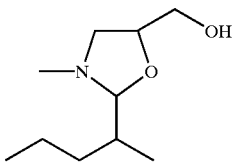

(13)

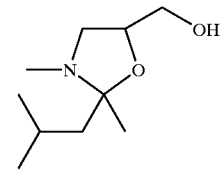

(14)

The oxazolidine compound represented by the formula (1) may be used alone or in combination of two or more. The oxazolidine compound represented by the formula (1) functions as a latent curing agent for the first and second compositions of the present invention by undergoing ring opening through hydrolysis in the presence of moisture (water) to react with the thiirane ring and/or the oxirane ring to thereby cure the composition. Since the first and second compositions of the present invention contains the oxazolidine compound represented by the formula (1), the composition exhibits an adequately prolonged "tack free time" and an adequately prolonged time is allowed for the water required for the hydrolysis of the oxazolidine compound to penetrate into the composition. In addition, anion polymerization is believed to take place due to the tertiary amine formed after the surface curing, although this anion polymerization is yet to be confirmed. As a consequence, the first and second compositions of the present invention are quite excellent in depth curability and thickness of the film to be cured can be readily increased. Furthermore, since the oxazolidine compound represented by the formula (1) has a substituent around the heterocyclic nitrogen atom, and in particular, a bulky substituent wherein carbon at the first position is a branched carbon or a ring member carbon around the heterocyclic nitrogen atom, the first and second compositions of the present invention exhibit improved storage stability.

In contrast to the conventional epoxy resin composition which contained the oxazolidine compound as the latent curing agent and suffered from inferior surface curability to take several days for complete curing, the first and second compositions of the present invention containing the oxazolidine compound represented by the formula (1) having a particular structure wherein the ring-member carbon in the heterocyclic ring at the fifth position is substituted with methylol group exhibit excellent surface curability since the oxazolidine compound represented by the formula (1) undergoes hydrolysis at a high speed.

The oxazolidine compound represented by the formula (1) included in the first and second compositions of the present invention can be produced by reacting the aminoalcohol and the ketone or the aldehyde represented by the following formlae:

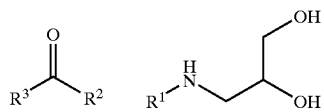

with heating under reflux in the absence of the solvent or in the presence of a solvent such as benzene, toluene, or xylene, and azeotropically removing the water separated. In the formulae, $R^1$, $R^2$, and $R^3$ are respectively as defined for $R^1$, $R^2$, and $R^3$ of the formula (1).

Content of the oxazolidine compound in the first and second compositions of the present invention is preferably such that the molar ratio [oxirane ring, thiirane ring, and isocyanate group/nitrogen atom in the oxazolidine] is in the range of 0.1 to 50, and more preferably, 0.5 to 10. When the content is within such range, the resulting first and second compositions of the present invention will exhibit excellent curability as well as improved storage stability.

The first and second compositions of the present invention may contain a curing agent or a latent curing agent which is normally used for the epoxy resin and/or the thiirane resin in addition to the oxazolidine compound represented by the formula (1) to the extent that it does not detract from the merits of the present invention. Typical examples of such curing agent and latent curing agent include the compound of the present invention used in the third composition of the present invention as will be described below, amine curing agent, acid or acid anhydride curing agent, basic active hydrogen-containing compounds, imidazoles, polymercaptane curing agents, phenol resins, urea resins, melamine resins, isocyanate curing agents, latent curing agents, and UV curing agents.

Next, the third aspect of the present invention is described.

The compound of the present invention is a compound obtained from an oxazolidine compound represented by the following formula (1) and a compound having at least one functional group selected from the group consisting of alkoxysilyl group, isocyanate group, vinylether group, and carboxy group through addition or condensation between hydroxy group of the oxazolidine compound and the functional group of said compound having at least one functional group.

The oxazolidine compound represented by the formula (1) is the same as the one described in regard of the first aspect of the present invention.

Exemplary compounds having at least one functional group selected from the group consisting of alkoxysilyl group, isocyanate group, vinylether group, and carboxy group are a compound having an alkoxysilyl group, a compound having isocyanate group, a compound having vinylether group, and a compound having carboxy group, which are described below.

The compound having an alkoxysilyl group may be any silane compound having at least one alkoxysilyl group in the molecule. The alkoxy group binding to the silyl group is preferably methoxy group, ethoxy group, or propoxy group in view of the availability of raw materials. Such compounds are preferably a bifunctional alkoxysilane, namely, an alkoxysilane having two or more alkoxysilyl groups in the molecule, and more preferably, an alkoxysilane having 3 to 20 functional groups in view of the availability of raw materials. The groups other than the alkoxy group binding to the silyl group are preferably hydrogen atom, or an alkyl group, an alkenyl group or an arylalkyl group having up to 20 carbon atoms such as methyl group, ethyl group, propyl group, or isopropyl group. If the compound having an alkoxysilyl group is the one as described above, removal of the alcohol produced in the exchange reaction with hydroxy group of the oxazolidine compound will be facilitated in the synthesis of the compound of the present invention which is used as a novel latent curing agent.

The compound having isocyanate group may be any compound having at least one isocyanate group in the molecule. The compound having isocyanate group, however, is preferably a diisocyanate or a triisocyanate having two or three isocyanate groups. Such diisocyanate or triisocyanate may be any isocyanate used for the one part urethane prepolymer. Examples include 2,4-tolylene diisocyanate, 2,6-tolylene diisocyanate, phenylene diisocyanate, diphenylmethane diisocyanate, 1,5-naphthalene diisocyanate, tolidine diisocyanate, triphenylmethane triisocyanate, bicycloheptane triisocyanate, tris(isocyanatephenyl)thiophosphate, and other aromatic polyisocyanate and hydrogenated derivatives thereof; ethylene diisocyanate, propylene diisocyanate, tetramethylene diisocyanate, hexamethylene diisocyanate, trimethylhexamethylene diisocyanate, 1,6,11-undecane triisocyanate, 1,3,6-hexamethylene triisocyanate, and other aliphatic polyisocyanates; isophorone diisocyanate and other alicyclic polyisocyanates; xylylene diisocyanate, tetramethylxylene diisocyanate and other arylaliphatic polyisocyanates and hydrogenated derivatives thereof. Examples also include polyfunctional isocyanate compounds produced by the reaction between the isocyanate groups of such di- and triisocyanate compounds to form an isocyanurate ring, and polyfunctional isocyanate compounds and urethane prepolymers produced by the reaction of these di- and triisocyanate compounds with a polyol. Such isocyanate compounds may preferably have a molecular weight of up to 20,000 since the isocyanate compound having a molecular weight of up to 20,000 does not exhibit unduly high viscosity and the compound may exhibit a favorable working convenience.

Preferably, the compound having vinylether group is a compound having at least two vinylether groups in the molecule. Exemplary such compounds having vinylether group include ethylene glycol divinylether, triethylene glycol divinylether, butanediol divinylether, 2,2-bis[p-(2-vinyloxyethoxy)phenyl]propane, cyclohexanediol divinylether, cyclohexane dimethanol divinylether, trimethylpropane trivinylether, and pentaerythritol trivinylether.

The compound having carboxy group may be acrylic acid, methacrylic acid, crotonic acid, 2-pentinic acid, maleic acid, fumaric acid, itaconic acid, and pyromellitic acid.

Among these, the preferred are dibasic and polybasic acids having two or more carboxy groups in the molecule.

The compounds having at least one functional group selected from the group consisting of alkoxysilyl group, isocyanate group, vinylether group, and carboxy group to be reacted with the hydroxy group of the oxazolidine compound may include functional groups of two or more types including the functional groups as described above. Exemplary such compounds include silane coupling agents such as an alkylmethyldimethoxysilane, an alkyltrimethoxysilane, an alkylmethyldiethoxysilane, and an alkyltriethoxysilane having at least one of the epoxy group, vinyl group, (meth)acryl group, isocyanate group, and carboxy group.

Typical compound of the present invention is the one represented by the following formula (15) produced through condensation between hydroxy group of the oxazolidine compound represented by the formula (1) and the alkoxy group of the compound having an alkoxysilyl group.

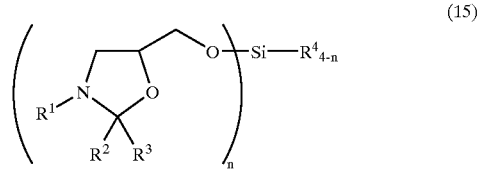

(15)

In the formula (15), $R^1$, $R^2$, and $R^3$ are as defined for $R^1$, $R^2$, and $R^3$ of the formula (1); $R^4$ may preferably represent hydrogen atom, or an alkyl group, an alkenyl group, an arylalkyl group or an alkoxy group; and n is an integer of 1 to 4.

Exemplary hydrocarbon groups having 1 to 6 carbon atoms represented by $R^1$ in the formula (15) include alkyl groups having 1 to 6 carbon atoms such as methyl group, ethyl group, propyl group, isopropyl group, butyl group, isobutyl group, s-butyl group, t-butyl group, pentyl group, isopentyl group, neopentyl group, t-pentyl group, 1-methylbutyl group, 2-methylbutyl group, 1,2-dimethylpropyl group, hexyl group, isohexyl group, 1-methylpentyl group, 2-methylpentyl group, 3-methylpentyl group, 1,1-dimethylbutyl group, 1,2-dimethylbutyl group, 2,2-dimethylbutyl group, 1,3-dimethylbutyl group, 2,3-dimethylbutyl group, 3,3-dimethylbutyl group, 1-ethylbutyl group, 2-ethylbutyl group, 1,1,2-trimethylpropyl group, 1,2,2-trimethylpropyl group, 1-ethyl-1-methylpropyl group, and 1-ethyl-2-methylpropyl group; and alkenyl groups corresponding to such alkyl groups, respectively. Among the hydrocarbon groups as mentioned above, $R^1$ is preferably methyl group or ethyl group, and most preferably methyl group.

Exemplary monovalent hydrocarbon groups having 1 to 15 carbon atoms for $R^2$ and $R^3$ include a straight-chain or a branched alkyl group having 1 to 15 carbon atoms (such as the alkyl group having 1 to 6 carbon atoms mentioned for $R^1$), an alkenyl group or an alkynyl group corresponding to such alkyl group; an aryl group which may be substituted with 1 or more substituent; an arylalkyl group; and a cycloalkyl group which may be substituted with 1 or more substituent. Examples include straight chain alkyl groups such as methyl group, ethyl group, propyl group, butyl group, pentyl group, octyl group, dodecyl group, and lauryl group; branched alkyl groups such as isopropyl group, isobutyl group, s-butyl group, t-butyl group, isopentyl group, neopentyl group, t-pentyl group, 1-methylbutyl group, and 1-methylheptyl group; alkenyl groups such as vinyl group, allyl group, isopropenyl group, and 2-methylallyl group; aryl groups such as tolyl group (o-, m-, p-), dimethylphenyl group, and mesityl group; arylalkyl groups such as benzyl group, phenethyl group, and α-methylbenzyl group; and cycloalkyl groups such as cyclopentyl group and cyclohexyl group.

The alicyclic or the aromatic ring which $R^2$ and $R^3$ may together represent may be an alicyclic or an aromatic ring having 4 to 10 carbon atoms. Exemplary alicyclic rings having 4 to 10 carbon atoms include cyclobutyl group, cyclopentyl group, cyclohexyl group, cycloheptyl group, and cyclooctyl group; and exemplary aromatic rings having 4 to 10 carbon atoms include phenyl group, benzyl group, tolyl group (o-, m-, p-), and xylyl group.

Among such functional groups, $R^2$ is preferably a bulky group such as a branched hydrocarbon group or a hydrocarbon group containing an alicyclic or an aromatic ring, for example, a branched alkyl group such as isobutyl group, an aryl group, an arylalkyl group, or a cycloalkyl group, since nitrogen atom in the heterocycle (oxazolidine ring) will then be protected through steric hindrance by such substituent to result in a considerably reduced basicity of the nitrogen atom, and hence, the resulting third composition of the present invention will exhibit an improved storage stability.

Among such functional group, $R^2$ is most preferably a hydrocarbon group wherein carbon at the first position is a branched carbon or a ring-member carbon, since the resulting first or the second composition of the present invention will exhibit an improved storage stability.

Examples of the $R^2$ wherein carbon at the first position of the hydrocarbon group is a branched carbon include isopropyl group, s-butyl group, t-butyl group, t-pentyl group, 1-methylbutyl group, 1-methylheptyl group, and isopropenyl group.

Examples of the $R^2$ wherein carbon at the first position of the hydrocarbon group is a ring-member carbon include aryl groups such as phenyl group, tolyl group (o-, m-, p-), and dimethylphenyl group; arylalkyl groups such as α-methylbenzyl group; and cycloalkyl groups such as cyclopentyl group, cyclohexyl group, and methylcyclohexyl group. The ring-member carbon may be either a carbon constituting an aromatic ring or an alicyclic ring.

Among these, $R^2$ is most preferably isopropyl group, t-butyl group, or cyclohexyl group in view of the availability of raw materials and ease of synthesis.

When $R^4$ is an alkoxy group, $R^4$ is preferably methoxy group, ethoxy group, or propoxy group in view of the availability of raw materials. When $R^4$ is an alkyl group, an alkenyl group or an arylalkyl group, $R^4$ is preferably an alkyl group, an alkenyl group or an arylalkyl group having up to 20 carbon atoms such as methyl group, ethyl group, propyl group, or isopropyl group. If $R^4$ is the one as described above, removal of the alcohol produced in the exchange reaction with hydroxy group of the oxazolidine compound will be facilitated during the synthesis of the compound of the present invention which is used as a novel latent curing agent.

When the compound represented by the formula (15) is incorporated as a novel latent curing agent in the curable resin composition, the resulting curable resin composition will be endowed with an improved storage stability without detracting from the excellent curability.

Accordingly, the compound represented by the formula (15) is useful as a latent curing agent for an epoxy resin, thiirane resin, urethane resin, and the like. Use of such compound as a latent curing agent of an epoxy resin and/or a thiirane resin is particularly favorable since the resulting resin will exhibit superior surface curability and storage stability, and in particular, a markedly superior storage stability under the condition where the resin composition only contains the resin component and the latent curing agent compared to the case when a conventional latent curing agent is used.

Next, the fourth aspect of the present invention is described.

The third composition of the present invention contains the compound of the present invention as described above as its latent curing agent; and an epoxy resin and/or a thiirane resin as its main component. The epoxy resin is not limited to any particular type as long as it is a compound or a polymer containing epoxy group such as a bisphenol A epoxy resin, a brominated epoxy resin, a bisphenol F epoxy resin, a novolac epoxy resin, an alicyclic epoxy resin, triglycidyl isocyanurate, or the like, or alternatively, a modified epoxy resin. Among these, bisphenol A epoxy resin is preferable since it is a commodity epoxy resin. The thiirane resin can be produced by replacing oxygen atom in the epoxy group of the epoxy resin with sulfur atom for conversion into thiirane. In such a case, the epoxy group can be either partly or entirely converted into the thiirane. The ratio of the thiirane group to the epoxy group in the resin may be adequately selected depending on the intended use of the resulting product.

In the third composition of the present invention, the epoxy resin and/or the thiirane resin which is the main component and the compound of the present invention which is the latent curing agent may be blended preferably at a ratio such that the oxazolidine is at an equivalent ratio of 0.1 to 5.0, and more preferably at an equivalent ratio of 0.1 to 1.5 to the total of the epoxy group and the thiirane group. When the equivalent ratio is less than 0.1, the resulting composition may suffer from unsuccessful curing while equivalent ratio in excess of 5.0 may result in the unduly increased residual tack of the resulting composition.

The third composition of the present invention is very useful since it has excellent surface curability and storage stability, and in particular, excellent storage stability under the condition where the resin composition only contains the resin component and the latent curing agent.

The third composition of the present invention may also contain a curing agent or a latent curing agent which is normally used with the epoxy resin and/or the thiirane resin in addition to the compound of the present invention to the extent that it does not detract from the merits of the present invention. Examples of such curing agent or latent curing agent include the oxazolidine compound represented by the formula (1) used in the first and second compositions of the present invention, amine curing agents, acid or acid anhydride curing agents, basic active hydrogen-containing compounds, imidazoles, polymercaptane curing agents, phenol resins, urea resins, melamine resins, isocyanate curing agents, latent curing agents, and UV curing agents. When such other curing agent or latent curing agent is incorporated in the composition, such agent should be blended so that the equivalent ratio of the total amount of the active hydrogen in all the curing agent components to the total of the epoxy group and the thiirane group is preferably in the range of 0.1 to 5.0, and more preferably in the range of 0.2 to 2.0.

The first, the second and the third composition of the present invention (hereinafter simply referred to as "the composition of the present invention") may further comprise various optional additives in addition to the components as described above. Exemplary such additives include a filler, a plasticizer, a silane coupling agent, a thixotropic agent, a pigment, a dye, an antiaging agent, an antioxidant, an antistatic agent, a flame retardant, a tackifier, a dispersant, and a solvent.

The filler used may have various shapes, and exemplary fillers include organic and inorganic fillers such as fumed silica, calcined silica, precipitated silica, pulverized silica, and molten silica; diatomaceous earth; iron oxide, zinc oxide, titanium oxide, barium oxide, and magnesium oxide; calcium carbonate, magnesium carbonate, and zinc carbonate; talc clay, kaolin clay, and calcined clay; carbon black; and any of these further treated with a fatty acid, a resin acid, a fatty ester, or a fatty ester-urethane compound.

Exemplary plasticizers include dioctyl phthalate (DOP) and dibutyl phthalate (DBP); dioctyl adipate and isodecyl succinate; diethylene glycol dibenzoate, and pentaerythritol ester; butyl oleate and acetylricinoleic methyl; tricresyl phosphate and trioctyl phosphate; and polypropylene glycol adipate and butylene glycol adipate.

Exemplary preferable silane coupling agents include trimethoxy vinylsilane, γ-glycidoxy propyltrimethoxysilane, isocyanate propyltrimethoxysilane, and ketimine-modified propyltrimethoxysilane, which are commodity chemicals convenient for use.

Exemplary thixotropic agents include AEROSIL (manufactured by Nippon Aerosil K.K.), Dispalon (manufactured by Kusumoto Chemicals, Ltd.), calcium carbonate, and teflon.

Exemplary pigments include inorganic pigments such as titanium dioxide, zinc oxide, ultramarine, iron oxide, lithopone, lead, cadmium, iron, cobalt, aluminum, chloride, and sulfate; and organic pigments such as azo pigment and copper phthalocyanine pigment.

Exemplary antiaging agents include compounds such as hindered phenols and hindered amines.

Exemplary antioxidants include butylhydroxytoluene (BHT) and butylhydroxyanisole (BHA).

Exemplary antistatic agents include a quaternary ammonium salt; and hydrophilic compounds such as a polyglycol and an ethylene oxide derivative.

Exemplary flame retardants includes chloroalkyl phosphate, dimethylmethylphosphonate, bromine-phosphorus compound, ammonium polyphosphate, neopentylbromide-polyether, and brominated polyether.

Exemplary tackifiers include terpene resin, phenol resin, terpene-phenol resin, rosin resin, and xylene resin.

The additives as described above may be used in any adequate combination.

The method used for producing the composition of the present invention from the components as described above is not limited to any particular method. The composition of the invention, however, is preferably made by a method wherein the components are thoroughly kneaded in an agitating device such as a mixer under reduced pressure or in an inert atmosphere such as nitrogen for uniform dispersion of the components.

The composition of the present invention is well adapted as an adhesive, sealant, coating composition, rust preventive coating, primer, coating material, foaming material, and the like, for use in civil engineering and construction applications, concrete, wood, metal, and the like.

EXAMPLES

The present invention is described in further detail by referring to the following Examples which by no means limit the scope of the present invention.

Examples 1 to 3 and Comparative Examples 1 to 4

The components shown in Table 1, below were blended according to the composition (parts by weight) indicated in the table to produce the resin compositions. The resulting resin compositions were evaluated for their surface curing time (surface curability) and viscosity change (storage stability) as described below. The results are also shown in Table 1. In the table, the molar ratio of [oxirane ring, thiirane ring and isocyanate group/nitrogen atom in oxazolidine] is indicated as "molar ratio".

<Surface Curing Time (Surface Curability)>

The resin composition was filled almost to the edge of a cup-shaped polypropyrene container with a height of 1 cm. The resin composition was then allowed to stand at a temperature of 20° C. and a relative humidity of 60%. In the meanwhile, a polyethylene sheet was brought in contact with the surface of the resin composition, and the time was measured in hours (h) until no tack was observed between the polyethylene sheet and the resin composition.

<Viscosity Change (Storage Stability)>

The resin compositions were evaluated for their viscosity immediately after their production, and after placing in a sealed container and storing at 70° C. for 1 day (24 hours). Viscosity change was determined by dividing the viscosity after storage by the viscosity immediately after the production. The unit is "folds". The viscosity was measured at 20° C. by using a type E viscometer with a cone spindle of 3 degrees. The samples which were unmeasurable due to their curing are indicated in the table as "Cured".

TABLE 1

|  | Ex.1 | Ex.2 | Ex.3 | C.E.1 | C.E.2 | C.E.3 | C.E.4 |
|---|---|---|---|---|---|---|---|
| Thiirane resin 1 | 100 | 70 | — | — | — | — | 100 |
| Thiirane resin 2 | — | — | 100 | — | — | — | — |
| Epoxy resin 1 | — | — | — | 100 | 70 | 100 | — |
| Urethane prepolymer | — | 30 | — | — | 30 | — | — |
| Oxazolidine | 30 | 30 | 10 | 30 | 30 | — | — |
| Ketimine | — | — | — | — | — | 40 | 40 |
| Molar ratio | 3.62 | 2.56 | 1.2 | 3.25 | 2.31 | 3.71 | 4.14 |
| Surface curing time (h) | 15 | 12 | 16 | 18 | 20 | 22 | 18 |
| Viscosity change (folds) | 2.2 | 1.5 | 1.8 | 10 | 5.2 | Cured | Cured |

Ex.: Example
C.E.: Comparative Example

The components shown in Table 1 were as described below.

Thiirane resin 1: The bisphenol F thiirane resin represented by the following formula:

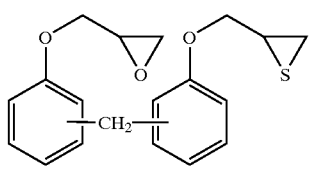

Oxirane ring/thiirane ring=50/50. Viscosity at 25° C.: 10,000 mPa·s.

Epoxy resin 1: Bisphenol A epoxy resin, EP4100E manufactured by Asahi Denka Kogyo K.K.

Urethane prepolymer (isocyanate group-containing compound): A prepolymer synthesized by mixing trifunctional PPG (polypropylene glycol) and TDI (tolylene diisocyanate) at NCO/OH of 2. Number average molecular weight: 5000.

Thiirane resin 2: A resin represented by the following formula:

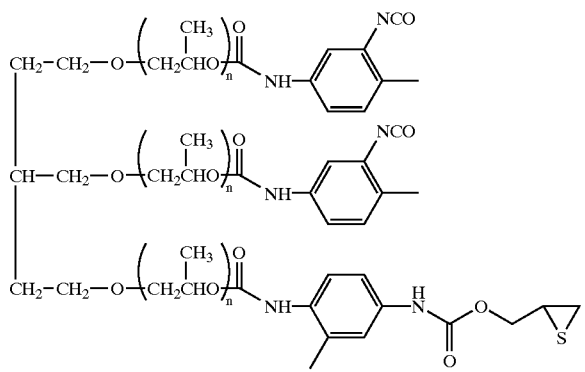

This resin was produced by reacting ⅓ equivalent of the compound produced by thiirane conversion of glycidol with terminal isocyanate group of the urethane prepolymer having a number average molecular weight of 5,000 as described above. Viscosity at 25° C.: 25,000 mPa·s.

Oxazolidine: The oxazolidine represented by the following formula:

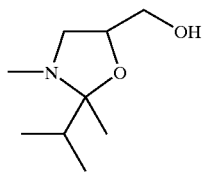

Ketimine: The ketimine represented by the following formula:

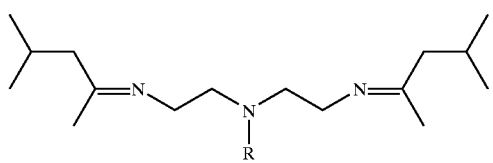

As shown in Table 1, the resin composition of Example 1 comprising a thiirane ring-containing resin component in addition to the oxazolidine compound represented by the formula (1); the resin composition of Example 2 further comprising the urethane prepolymer; and the resin composition of Example 3 containing the compound having both the isocyanate group and the thiirane ring exhibited excellent curability and reduced viscosity change, and also, quite favorable storage stability under the condition where the resin compositions only contained the resin component and the latent curing agent. In contrast, the resin compositions of Comparative Examples 1 to 3 free from the thiirane ring-containing resin were inferior in their curability and storage stability. The resin composition of Comparative Example 4 prepared by using conventional ketimine for the latent curing agent instead of the oxazoliine compound of Example 1 was also inferior in both the curability and the storage stability.

Examples 4 to 6 and Comparative Examples 5 to 7

An epoxy resin, a thiirane resin, and the latent curing agent A which is the compound of the present invention, and conventional latent curing agents B and C were mixed at the blend ratio shown in Table 2, and the mixtures were kneaded uniformly to produce the one part, moisture curable resin compositions of Examples 4 to 6 and Comparative Examples 5 to 7. The resin compositions were evaluated for their surface curing time and storage stability by the procedure as in the case of Examples 1 to 3 and Comparative Examples 1 to 4. The results are shown in Table 2.

TABLE 2

|  | Ex.4 | Ex.5 | Ex.6 | C.E.5 | C.E.6 | C.E.7 |
|---|---|---|---|---|---|---|
| Epoxy resin 2 | 100 | 100 | — | 100 | 100 | — |
| Thiirane resin 3 | — | — | 100 | — | — | 100 |
| Latent curing agent A | 40 | 20 | 40 | — | — | — |
| Latent curing agent B | — | 15 | — | 40 | — | — |
| Latent curing agent C | — | — | — | — | 40 | 40 |
| Surface curing time (h) | 15 | 18 | 10 | 22 | 22 | 15 |
| Viscosity change (folds) | 1.3 | 1.5 | 2.2 | 3.5 | Cured | Cured |

Ex.: Example
C.E.: Comparative Example

The components shown in Table 2 were as described below.

Epoxy resin 2: Bisphenol A epoxy resin, DER332 manufactured by Dow Chemical Ltd.

Thiirane resin 3: Bisphenol F epoxy resin (EPICLON803 manufactured by Dainippon Ink & Chemicals, Inc.) was reacted with KSCN (episulfidating agent) in a mixed solvent (water/methanol, 2/1) at room temperature for 20 hours for conversion into thiirane. The reaction product was then washed with water and dried to produce thiirane resin 3 having 50% of its oxirane ring replaced with thiirane ring.

Latent curing agent A: 300 g of 1-(methylamino) propanediol (manufactured by Daicel Chemical Industries, Ltd.), 450 g of methyl isopropyl ketone (manufactured by Kuraray Co., Ltd.), and 600 g of toluene were mixed, and the mixture was heated under reflux in the presence of acetic acid catalyst for 24 hours, while the water produced was azeotropically removed. The reaction was terminated when the amount of water produced reached about 52 ml, the theoretical value. Excess ketone and toluene were removed by distillation to produce an oxazolidine compound having hydroxy group with the molecular weight of 173. Next, 100 g of this oxazolidine compound was mixed with 30.1 g of tetraethoxysilane (reagent) at 70° C. in the presence of isopropoxy titanium catalyst. The reaction was allowed to proceed under reduced pressure, and the ethanol that had been produced was removed from the reaction system. After 6 hours, ethanol was completely removed by allowing the reaction to take place at 100° C. under reduced pressure for 1 hour to thereby obtain latent curing agent A which is represented by the following formula (16):

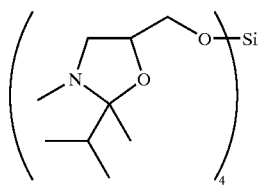

(16)

Latent curing agent B: 100 g of Norbornane diamine (NBDA) (manufactured by Mitsubishi Chemical Corp.), 167 g of methyl isopropyl ketone (manufactured by Kuraray Co., Ltd.), and 200 g of toluene were mixed, and the mixture was heated under reflux for 18 hours with the water produced being azeotropically removed. After the completion of the reaction, the ketone which did not react and the toluene were removed to obtain the latent curing agent B represented by the following formula (17):

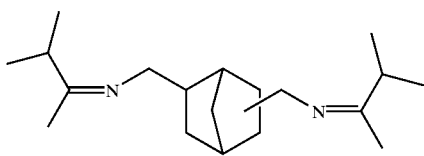

(17)

Latent curing agent C: Epicure H-3 (manufactured by Japan Epoxy Resins Co., Ltd) represented by the following formula (18):

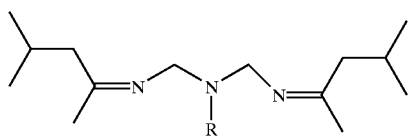

(18)

As shown in Table 2, third composition of the present invention (Examples 4 to 6) prepared by using the latent curing agent A which is the compound of the present invention exhibited superior surface curability, remarkably smaller viscosity change, and better storage stability under the condition where the resin compositions only contained the resin component and the latent curing agent compared to the cases where the composition was prepared by using the conventional latent curing agent B or C (Comparative Examples 5 to 7).

Merits of the Invention

As described with regard to the first aspect of the present invention, a curable composition exhibiting excellent curability and improved storage stability, and in particular, an improved storage stability under the condition where the resin composition only contains the resin component and the latent curing agent can be produced by constituting the curable resin composition from a resin component having oxirane ring and thiirane ring at a ratio (oxirane ring/thiirane ring) of 95/5 to 1/100 and an oxazolidine compound represented by the formula (1).

As described with regard to the second aspect of the present invention, a curable composition exhibiting excellent curability and improved storage stability, and in particular, an improved storage stability under the condition where the resin composition only contains the resin component and the latent curing agent can be produced by constituting the curable resin composition from a resin compound having isocyanate group and thiirane ring and an oxazolidine compound represented by the formula (1).

The compound of the present invention according to the third aspect of the present invention is well adapted for use as a latent curing agent for epoxy resin, thiirane resin and the like, since this compound exhibits excellent storage stability as well as high surface curing speed.

The third composition of the present invention according to the fourth aspect of the present invention exhibits favorable curability, and in particular, favorable surface curability. It also exhibits good storage stability, and in particular, good storage stability under the condition where the resin composition only contains the resin component and the latent curing agent.

What is claimed is:
1. A curable resin composition comprising
a resin component having oxirane ring and thiirane ring at a ratio (oxirane ring/thiirane ring) of 95/5 to 1/100; and
an oxazolidine compound represented by the following formula (1):

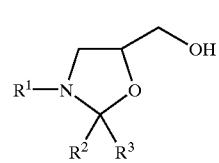

(1)

wherein $R^1$ represents a hydrocarbon group having 1 to 6 carbon atoms, and
$R^2$ and $R^3$ independently represent hydrogen atom or a monovalent hydrocarbon group having 1 to 15 carbon atoms, or together form an alicyclic ring or an aromatic ring.
2. A curable resin composition according to claim 1 further comprising an isocyanate compound having at least two isocyanate groups in one molecule.
3. A curable resin composition comprising
a resin compound having isocyanate group and thiirane ring; and
an oxazolidine compound represented by the following formula (1):

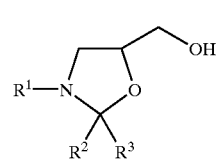

(1)

wherein $R^1$ represents a hydrocarbon group having 1 to 6 carbon atoms, and
$R^2$ and $R^3$ independently represent hydrogen atom or a monovalent hydrocarbon group having 1 to 15 carbon atoms, or together form an alicyclic ring or an aromatic ring.

4. A curable resin composition according to claim 1 wherein $R^1$ is methyl group or ethyl group.

5. A curable resin composition according to claim 2 wherein $R^1$ is methyl group or ethyl group.

6. A curable resin composition according to claim 3 wherein $R^1$ is methyl group or ethyl group.

7. A curable resin composition according to claim 1 wherein $R^2$ is a hydrocarbon group wherein carbon at the first position is a branched carbon or a ring member carbon.

8. A curable resin composition according to claim 2 wherein $R^2$ is a hydrocarbon group wherein carbon at the first position is a branched carbon or a ring member carbon.

9. A curable resin composition according to claim 3 wherein $R^2$ is a hydrocarbon group wherein carbon at the first position is a branched carbon or a ring member carbon.

10. A curable resin composition according to claim 4 wherein $R^2$ is a hydrocarbon group wherein carbon at the first position is a branched carbon or a ring member carbon.

11. A curable resin composition according to claim 5 wherein $R^2$ is a hydrocarbon group wherein carbon at the first position is a branched carbon or a ring member carbon.

12. A curable resin composition according to claim 6 wherein $R^2$ is a hydrocarbon group wherein carbon at the first position is a branched carbon or a ring member carbon.

13. A compound obtained from an oxazolidine compound represented by the following formula (1):

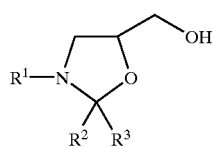

(1)

wherein $R^1$ represents a hydrocarbon group having 1 to 6 carbon atoms, and $R^2$ and $R^3$ independently represent hydrogen atom or a monovalent hydrocarbon group having 1 to 15 carbon atoms, or together form an alicyclic ring or an aromatic ring, and a compound having at least one functional group selected from the group consisting of alkoxysilyl group, isocyanate group, vinylether group, and carboxy group, through addition or condensation between hydroxy group of said oxazolidine compound and the functional group of said compound having at least one functional group.

14. A compound according to claim 13 wherein $R^1$ is methyl group or ethyl group.

15. A compound according to claim 13 wherein $R^2$ is a hydrocarbon group wherein carbon at the first position is a branched carbon or a ring member carbon.

16. A compound according to claim 14 wherein $R^2$ is a hydrocarbon group wherein carbon at the first position is a branched carbon or a ring member carbon.

17. A curable resin composition comprising at least one resin selected from epoxy resin and thiirane resin; and a compound of claim 13.

18. A curable resin composition comprising at least one resin selected from epoxy resin and thiirane resin; and a compound of claim 14.

19. A curable resin composition comprising at least one resin selected from epoxy resin and thiirane resin; and a compound of claim 15.

20. A curable resin composition comprising at least one resin selected from epoxy resin and thiirane resin; and a compound of claim 16.

* * * * *